No. 614,731. Patented Nov. 22, 1898.
C. R. LAWWILL.
ICE CUTTING MACHINE.
(Application filed Nov. 4, 1897.)

(No Model.) 2 Sheets—Sheet 1.

Witnesses: Franck L. Ourand. Jos. L. Coombs.

Inventor: Chas. R. Lawwill.
G. Lewis Bagger & Co.,
Attorneys.

No. 614,731.  Patented Nov. 22, 1898.
C. R. LAWWILL.
ICE CUTTING MACHINE.
(Application filed Nov. 4, 1897.)
(No Model.) 2 Sheets—Sheet 2.
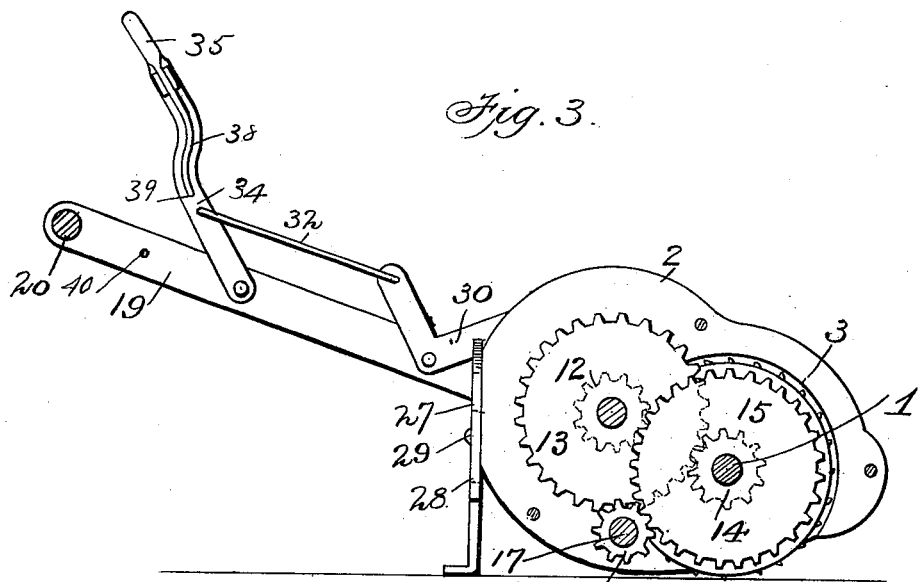
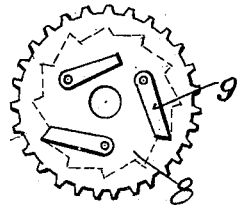
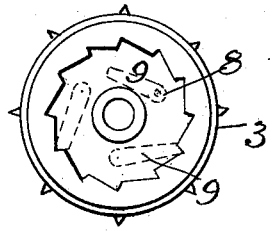
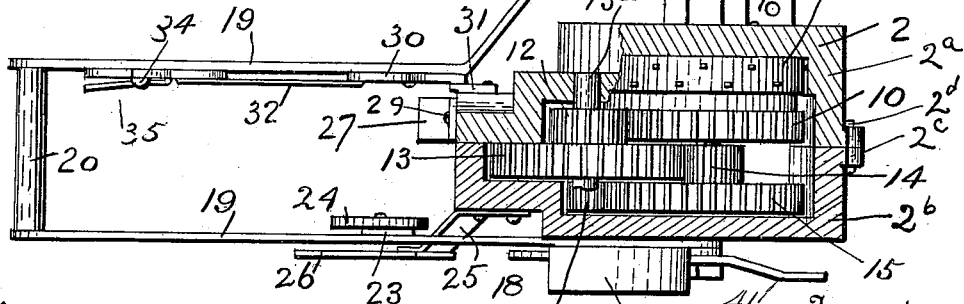
Witnesses:
Franck L. Ourand
Jos. L. Coombs
Inventor:
Chas. R. Lawwill
by Louis Bagger & Co.
Attorneys.
THE NORRIS PETERS CO., PHOTO-LITHO., WASHINGTON, D. C.

UNITED STATES PATENT OFFICE.

CHARLES R. LAWWILL, OF MANCHESTER, OHIO.

ICE-CUTTING MACHINE.

SPECIFICATION forming part of Letters Patent No. 614,731, dated November 22, 1898.

Application filed November 4, 1897. Serial No. 657,370. (No model.)

*To all whom it may concern:*

Be it known that I, CHARLES R. LAWWILL, a citizen of the United States, and a resident of Manchester, in the county of Adams and State of Ohio, have invented certain new and useful Improvements in Ice-Cutting Machines; and I do hereby declare that the following is a full, clear, and exact description of the invention, which will enable others skilled in the art to which it appertains to make and use the same, reference being had to the accompanying drawings, which form a part of this specification.

My invention relates to machines for cutting ice in rivers, ponds, lakes, and other similar places; and its object is to provide an improved construction of the same which shall possess superior advantages with respect to efficiency in use.

The invention consists in the novel construction and combination of parts hereinafter fully described and claimed.

Figure 1:
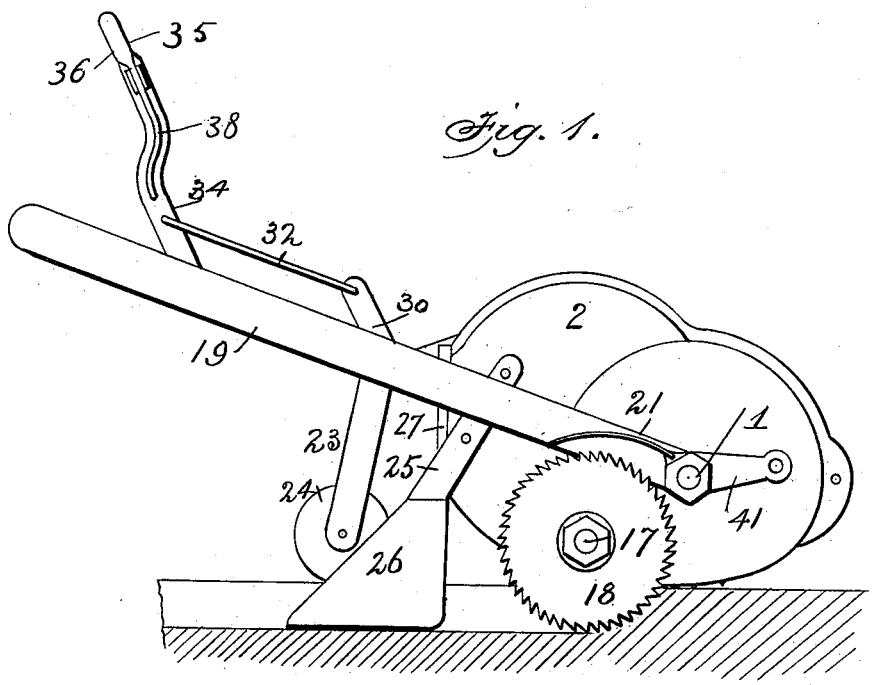
Figure 4:
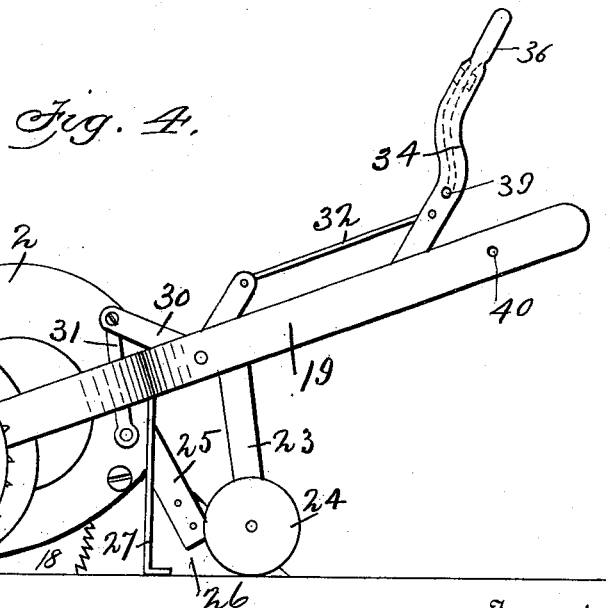

In the accompanying drawings, Figure 1 is a side elevation of an ice-cutting machine constructed in accordance with my invention. Fig. 2 is a plan view of the same, the housing being broken away to show the interior construction. Fig. 3 is a longitudinal section, one of the sections of the housing being removed. Fig. 4 is a side elevation. Figs. 5 and 6 are detail views.

In the said drawings the reference-numeral 1 designates the axle of the machine, provided near one end with a sectional housing 2, in which is located a driving-wheel 3, journaled on the axle. Said housing is made in two parts, comprising end heads $2^b$, formed with inwardly-extending flanges $2^c$, and are secured together by screw bolts or rods $2^d$, passing therethrough. This axle works in a sleeve $2^a$, secured to one end of the housing. At the other end the axle is provided with an adjustable marking-wheel 4, having peripheral teeth or projections 5. This end of the axle is screw-threaded, so as to allow of the adjustment of the wheel, which is held in place by nuts. The driving-wheel is formed upon one side with a ratchet 8, which engages with dogs 9 on a wheel 10, journaled on the axle 1. This wheel meshes with a pinion 12, secured to a cog-wheel 13, which meshes with a pinion 14 on shaft 1. This pinion is secured to a cog-wheel 15, which meshes with a pinion 16 on shaft 17, provided with a saw 18. The said gears are so proportioned as to give a very high speed to the saw-shaft. All of said gears are loose on their respective shafts except pinion 16, which is fast to the saw-shaft 17.

The numeral 19 designates two rearwardly-extending arms, secured at their front ends to the axle and the rear ends connected together by a cross-bar 20, forming a handle. One of these bars is provided with a fender 21, extending up over the saw, and is also provided with an arm 23, to the lower end of which is journaled a supporting-wheel 24, which travels upon the ice. Secured to the housing is an arm 25, provided with a plate 26, which runs in the cut made by the saw and guides the machine. Also secured to the housing is a gage 27, formed with a slot 28, through which passes a headed screw 29. By moving this gage up or down the depth of cut of the saw can be regulated. The lower end of the gage travels on the ice. Pivoted to the other arm 19 is a bell-crank lever 30, one arm of which is pivoted to a link 31, pivoted to the housing. The other arm is connected by a rod 32 with a lever 34, pivoted to said arm and provided with a spring-actuated detent 35. This detent is pivoted to the lever 34 at 36 and consists of a handle 37 and a rod 38, the inner end of which is bent at a right angle and passes through a hole 39 in said lever and is adapted to engage with a corresponding hole 40 in one of the side bars 19 to hold said lever in place when depressed.

The numeral 41 designates an extension of one of the bars 19, formed with a hole to allow a whiffletree or rope to be connected therewith for drawing the apparatus over the ice, and one of the sections of the housing may be provided with an apertured lug 42 for the same purpose, if desired. (See Fig. 2.)

The numeral 43 designates nuts for holding the marking-wheel in its adjusted position.

The operation is as follows: As the machine is drawn over the ice the teeth of the driving-wheel will bite therein, turning said wheel, which, through the medium of the ratchet-wheel secured thereto engaging with the dogs pivoted to the gear 10, will rotate the latter. This gear will, through the medium of the pinion 12, gear 13, pinion 14, and gear 15, rapidly rotate the pinion 16, shaft 17, and saw 18, causing the latter to cut a kerf in the ice. At the same time the marking-wheel 5 will mark a line where the next cut is to be made. The plate 26, running in the cut made by the saw, serves as a guide for the machine. The gage 27 is adjustable, so as to regulate the depth of cut of the saw, and the wheel or roller 24 is for supporting the rear end of the machine.

The saw and plate can be raised so as to be out of contact with the ice by depressing the lever 34, which, through the medium of the bell-crank lever and link connected therewith, will elevate the rear end of the housing and with it the saw and plate. When said lever is thus depressed, the bent end of the rod 38 of the detent will engage with the holes 39 and 40 and hold it in such position.

Having thus fully described my invention, what I claim is—

1. In an ice-cutting machine, the combination with the sectional housing, the sleeve at one end thereof, the axle passing therethrough, the side bars to which the ends of said axle are secured and the adjustable marking-wheel at one end of said axle, of the driving-wheel having peripheral teeth, the ratchet secured thereto, the gear provided with the pivoted dogs engaging with said ratchet, the saw-shaft and pinion, and the intermediate gears and pinions, substantially as described.

2. In an ice-cutting machine, the combination with the sectional housing, the sleeve secured to one end thereof, the axle passing therethrough, the adjustable marking-wheel at one end of the axle, and the side bars secured to said axle, of the driving-wheel loose on said axle, the ratchet secured thereto, the gear provided with pivoted dogs engaging therewith, the saw-shaft, the pinion secured thereto, the intermediate gears and pinions, the saw, the guide-plate located in rear of and in line with said saw, the adjustable gage and the supporting-wheel, substantially as described.

3. In an ice-cutting machine, the combination with the sectional housing, the sleeve secured to one end thereof, the axle, the side bars secured thereto, the saw, and the driving-wheel and train of gearing for rotating said saw, of the bell-crank lever pivoted to one of said side bars, the link pivoted thereto and to said lever, the connecting-rod, the lever pivoted to one of said side bars and the spring-detent having a rod, the inner end of which is bent at an angle and adapted to engage with holes in said lever and side bar, substantially as described.

In testimony that I claim the foregoing as my own I have hereunto affixed my signature in presence of two witnesses.

CHARLES R. LAWWILL.

Witnesses:
  F. M. TOLLE,
  EDW. T. LAWWILL.